United States Patent
Yu et al.

(10) Patent No.: US 9,437,206 B2
(45) Date of Patent: Sep. 6, 2016

(54) VOICE CONTROL OF APPLICATIONS BY ASSOCIATING USER INPUT WITH ACTION-CONTEXT IDENTIFIER PAIRS

(71) Applicant: France Telecom, Paris (FR)

(72) Inventors: Dachuan Yu, Redwood City, CA (US); John Benko, San Francisco, CA (US); Satya Mallya, San Jose, CA (US)

(73) Assignee: FRANCE TELECOM, Paris (FR)

( * ) Notice: Subject to any disclaimer, the term of this patent is extended or adjusted under 35 U.S.C. 154(b) by 327 days.

(21) Appl. No.: 13/835,335

(22) Filed: Mar. 15, 2013

(65) Prior Publication Data
US 2013/0246050 A1     Sep. 19, 2013

Related U.S. Application Data

(60) Provisional application No. 61/611,803, filed on Mar. 16, 2012.

(51) Int. Cl.
| | |
|---|---|
| *G10L 15/18* | (2013.01) |
| *G10L 21/00* | (2013.01) |
| *G06F 3/16* | (2006.01) |
| *G10L 15/22* | (2006.01) |

(52) U.S. Cl.
CPC ........... *G10L 21/00* (2013.01); *G10L 15/1822* (2013.01); *G06F 3/167* (2013.01); *G10L 2015/223* (2013.01)

(58) Field of Classification Search
CPC ... G10L 15/18; G10L 15/1822; G10L 15/22; G10L 15/223
USPC .............................................................. 704/9
See application file for complete search history.

(56) References Cited

U.S. PATENT DOCUMENTS

| | | | |
|---|---|---|---|
| 2003/0014251 A1* | 1/2003 | Pokhariyal et al. | 704/251 |
| 2006/0070086 A1* | 3/2006 | Wang | 719/320 |
| 2006/0074652 A1* | 4/2006 | Ativanichayaphong et al. | 704/235 |
| 2006/0074980 A1* | 4/2006 | Sarkar | 707/104.1 |
| 2006/0136220 A1* | 6/2006 | Gurram et al. | 704/275 |
| 2006/0167784 A1* | 7/2006 | Hoffberg | 705/37 |
| 2006/0178918 A1* | 8/2006 | Mikurak | 705/7 |
| 2011/0288859 A1* | 11/2011 | Taylor et al. | 704/231 |

FOREIGN PATENT DOCUMENTS

WO    2011097174 A1    8/2011

OTHER PUBLICATIONS

European Search Report and Written Opinion dated Jun. 20, 2013 for corresponding European Application No. EP 13305250.

* cited by examiner

*Primary Examiner* — Michael N Opsasnick
(74) *Attorney, Agent, or Firm* — David D. Brush; Westman, Champlin & Koehler, P.A.

(57) ABSTRACT

A method is provided for enabling or enhancing a use of voice control in a voice controlled application (VCA) via a development framework. The method includes providing in the framework a plurality of action-context pairs usable in a memory of an application development device, which includes a processor. The action-context pairs serve to direct execution of the VCA, wherein the framework context defines a list of parameters related to the action and their respective value types. At least one of a voice recognition engine (VRE) and a natural language library is provided to match each action-context pair with a semantically related vocabulary. A registration mechanism is provided in the framework, which permits an association to be formed between an action-context pair and a handler in the voice controlled application. An associated development system for developing the VCA and user equipment that executes the VCA are provided as well.

19 Claims, 11 Drawing Sheets

| Context | |
|---|---|
| 262 Name N | 264 Value V |
| "addr-from" | "100 E Main" |
| "addr-to" | "150 W Elm" |
| "confidence" | "90" |
| ... | |

VOICE CONTROL OF APPLICATIONS BY ASSOCIATING USER INPUT WITH ACTION-CONTEXT IDENTIFIER PAIRS

CROSS-REFERENCE TO RELATED APPLICATION

The present application is based on and claims the benefit of U.S. Provisional Patent Application Ser. No. 61/611,803, filed Mar. 16, 2012, the content of which is hereby incorporated by reference in its entirety.

BACKGROUND

Providing an ability for devices to understand spoken language has been a goal since the early days in user interface (UI) development. The accuracy of spoken word recognition has improved dramatically in recent years, and is now being practically implemented on many devices.

In applications (apps) that can be controlled through a graphical user interfaces (GUIs) (e.g., the touch screen, mouse, keyboard/keypad, etc.), developers may use GUI event handling mechanisms to define the control over the GUIs. GUI events are typically generated by GUI components (e.g., buttons) and received by event listeners/handlers (code that contains the business logic, written by the developer) for processing.

FIG. 1 illustrates an exemplary UI menu tree structure for the Waze application, which is a popular social navigation app that allows users to share traffic conditions. As with most similar applications, this application utilizes a hierarchical tree menu structure having a main menu that includes a number of menu items, such as "Share" illustrated in the Figure. In a touch screen embodiment of the UI, the user might select the "Share" command and then be presented with further sub-menu options, such as "Email". Selection of this item allows the user to enter an e-mail utility to communicate with another person. However, these hierarchical tree structures are limited by screen assets, since one can only put so much on a typical small screen; even on big screens, the GUI can still be difficult to use if there are too many GUI components. Thus the hierarchical trees can be difficult for users to navigate.

The difference between touch control and voice control is that, with touch control, a touch input is of a specified and controlled type (e.g., specific button press, slider drag, etc.) and can be easily recognized deterministically through the touch panel. For example, if an application is expecting a user to select one of three options for a purchase, it can present three mutually exclusive radio buttons to the user. When the user selects one, it is clear which of the three expected buttons the user selected.

Voice control provides many benefits that are not present in the traditional touch-screen or keyboard device user-interface, in addition to generally being hands free. With voice control, it is easier for the user to discover and use various functionalities of the application—one does not have to have a detailed knowledge of a command/menu tree structure to know where to locate various functions. A voice UI is not limited by the screen assets available on the device and can help avoid an overload of control elements on a display. Also, a voice UI may be easier to learn how to use, since commands can be issued in natural language, and simple tutorials can be very effective.

For example, a user can rate a particular application without having to know where the "rate" function is within a menu structure, and can set application parameters and values without knowing, e.g., whether a particular setting is in a "general" or "advanced" setting area. It is also easier to navigate functionalities within the application. For example, a user may need only say, "Change language to French", in order to change the operative language of the application or device—the user does not have to wander through a menu hierarchy to locate this functionality.

Furthermore, voice control allows including multiple parameters in one spoken phrase (e.g., "Rate this application as 5 stars—best app ever!"), or even multiple actions in one spoken phrase: "Report traffic jam and find new route"; or "Find San Francisco Zoo and make it a favorite". This is simple to do even if the multiple actions would normally be located in two separate branches of a touch UI menu tree.

Take the Waze application as an example. An application programmer may wish to add a voice UI for a common action such as geographic navigation. Once added, the navigation could then be performed by the user with respect to an address (e.g., "drive to 123 N. Main St.") or to a favorite, such as a friend's home ("drive to Joe Schmoe's house") (presuming the address is in the user's contact book or otherwise accessible). In addition, an application programmer may wish to add a voice UI for a special action that is defined by the programmer—such as a report action (e.g., "the traffic at my location is heavy").

Developers of the Waze application have recently added support for a few simple voice commands (e.g., "drive to", "report traffic") into Waze. Ideally, an app like Waze should interact with users using natural language (as opposed to strict commands) for most functionalities, if not all, to be fully hands-free. Building such a complete voice UI, however, is a daunting task. Whereas developers have access to some fair-quality speech recognition engines, they have less access to technologies on natural language understanding.

In prior art, there is little framework or tool support to help adding natural-language voice UI into apps. Specifically, existing solutions to voice enabling applications include speech-to-text application program interfaces (APIs), grammar-based speech engines, and invocation of apps by speech.

Solutions on speech-to-text APIs (e.g., Dragon Mobile, MaCaption) help developers to translate speech input into text. Developers use an API to feed speech input to the speech engine behind the solution, which in turn returns a piece of text (e.g., "How to I get home?"). The developer may then parse the text to figure out the intention (i.e., what program functionality the user intends to execute) of the speech (e.g., find direction to home address) and turn the text into actionable commands. Obviously, much work on natural language understanding is needed by the developer to process natural language commands in plain text format.

Solutions on grammar-based speech engines (e.g., iSpeech, LumenVox, Tellme, OpenEars, WAMI) require that developers provide a grammar (in either a standard format such as the Speech Recognition Grammar Specification (SRGS) or a vendor-specific format) characterizing all allowed speech input. Take the following grammar in pseudo code as an example:

```
$place = home | office
$command = drive to ($place)
```

The above example allows two specific commands only: "drive to home" and "drive to office". The complexity of the grammar increases dramatically if the developer would like to support a larger set of commands and/or natural language commands (commands in a more flexible format, such as in verbal languages).

Solutions on invocation of apps by speech (e.g., Siri, Dragon Go!, Vlingo) provide a means for developers to link their apps with a speech-enabled dispatch center. For example, if an app is linked with Siri, then users can launch the app from Siri using voice commands. However, there are no voice commands supported in the app itself, once the app is launched.

SUMMARY

A method is provided for enabling or enhancing a use of voice control in a voice controlled application (VCA) via a development framework, the method comprising: providing in the framework a plurality of action-context pairs—also called framework action-context pairs—usable in a memory of an application development device comprising a processor, that serve to direct execution of the VCA, wherein the framework context defines a list of parameters related to the action and their respective value types; providing at least one of a voice recognition engine (VRE) and a natural language library to match each action-context pair with semantically related vocabulary; providing in the framework a registration mechanism that permits an association to be formed between an action-context pair and a handler in the voice controlled application.

A voice controlled application (VCA) development system is provided, comprising: a processor; a storage device accessible by the processor; a voice controlled application development framework comprising: a plurality of action-context pairs—also called framework action-context pairs—that serve to direct execution of the VCA, wherein the framework context defines a list of parameters related to the action and their respective value types; at least one of a voice recognition engine (VRE) and a natural language library to match each action-context pair with semantically related vocabulary; and a registration mechanism that permits an association to be formed between an action-context pair and a handler in the voice controlled application.

A user equipment (UE) is also provided, comprising: a microphone; a storage area; a VCA executable file that uses action-context pairs and associated VCA application handlers associated with each action-context pair; an assignment element that assigns VCA handler execution addresses to each of the application action-context pairs at run-time; an access element for accessing at least one of a voice recognition engine (VRE) and a natural language library on the UE or on a networked cloud and translating voice input into a run-time action-context pair, wherein the run-time context contains a list of parameter values related to the action; an execution element that executes a specific VCA handler at the VCA handler execution address associated with the run-time action-context pair.

A non-tangible computer readable media is also provided that contains software code instructions that, when executed on a processor, implement the above described method(s).

As described, a framework permits an application developer to easily and quickly create voice controlled applications that can be run from a user equipment (UE), while at the same time permitting the application developer to easily integrate new voice commands and functionality into his application.

DESCRIPTION OF THE DRAWINGS

Various embodiments of the invention are illustrated in the following drawing figures.

FIG. 4 is a block diagram illustrating an entry in a table, according to an embodiment;

DETAILED DESCRIPTION

Figure 1:
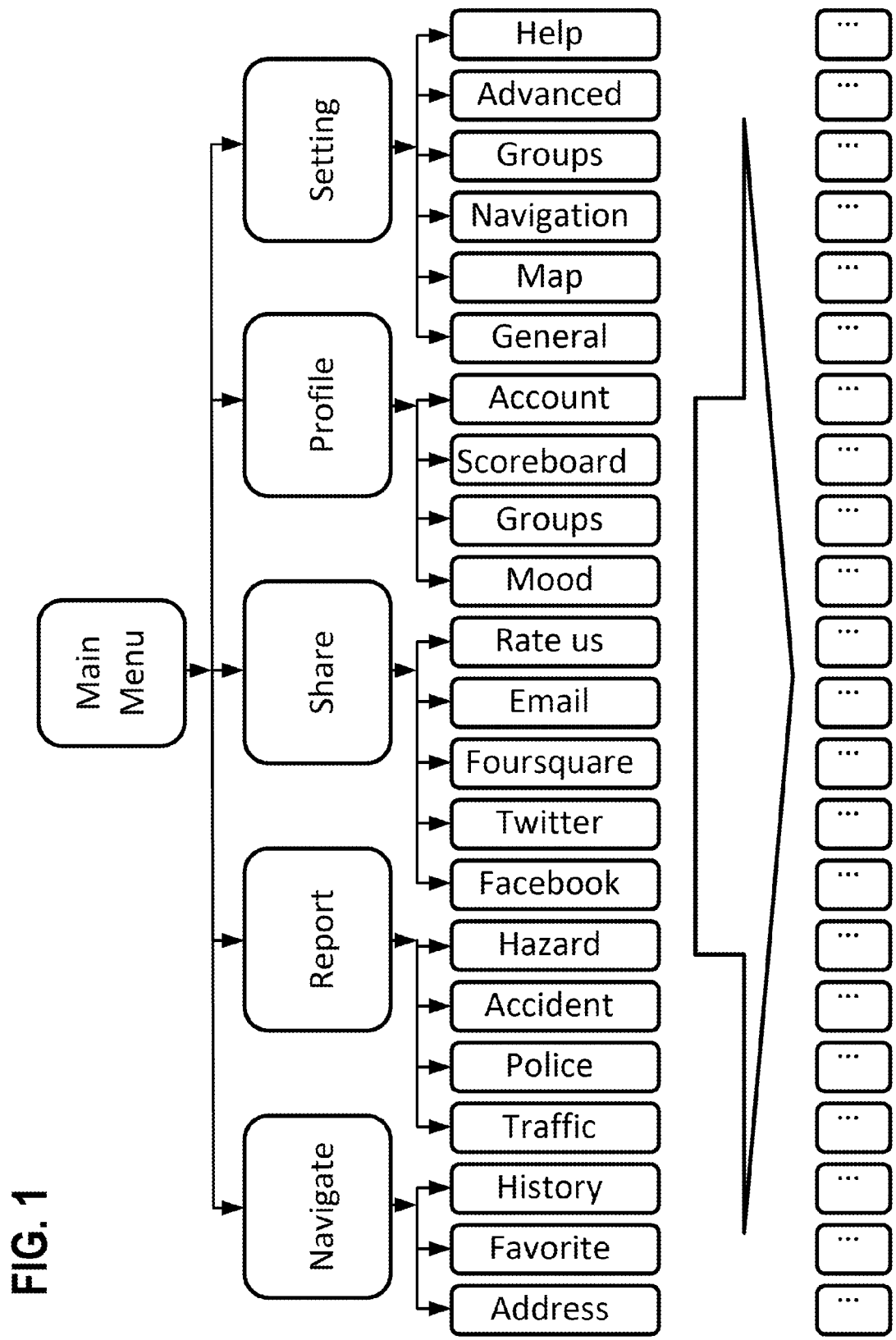
FIG. 1 is a tree diagram illustrating an exemplary GUI menu tree structure.

It is desirable to provide a structure, through use of a speech recognition and natural language understanding engine and associated development framework, that allows a simplified development of voice control applications (or to integrate voice control into existing applications) for developers. In a preferred embodiment of the framework, developers are given a specification and/or library categorizing common natural language sentences (e.g., "drive to", "how do I get to", "find direction to", . . . ) into actions (commands in an abstract format; e.g., the above sentences may all belong to a single action called "direction"). Developers may use an API to connect actions with code for handling them (e.g., code for getting direction).

The framework makes use of the speech recognition and natural language understanding engine to translate speech input into structured action-context pairs, where context refers to the parameters of the action (e.g., "home"), and dispatches the pairs to the corresponding code for execution. During the process, the speech recognition and natural language understanding engine may assemble automatically a grammar that is specialized to the application with information provided by the framework, alleviating the burden of the developer. Thus, developers are provided with an ability to build voice control inside their apps in an easy manner using the novel programming model described herein. The framework may also provide API for developers to define custom actions and/or commands as needed, beyond what is already offered built-in by the framework.

The framework relies on a set of predefined action-context pairs to work, and defines a handler definition mechanism (e.g., types, classes, or interfaces for the developer to use to define actions, contexts, and handlers), a registration mechanism (e.g., table, hash, or mapping to hold the registration at runtime), a dispatching mechanism (e.g., looking up the registration at runtime), and other utility mechanisms (e.g., start recognition, text-to-speech, or other elements), the mechanisms being, e.g., in a form of callable algorithms executable on a processor.

The following definitions and acronyms are used in the specification below.

| | |
|---|---|
| action | A way to refer to the intention behind a set of natural language sentences (voice commands) that serve similar purposes.<br>For example, a "direction" action can be used to refer to the intention behind many different sentences, including "drive to . . .", "how do I get to . . .", "find direction to . . .", etc.<br>A programmer may look up a specification provided by the framework for supported (predefined) actions. A programmer may also define custom actions by providing a list of special keywords/phrases for a given action, and these can be consumed by (integrated into) the present framework engine in pre-defined ways. |
| command | Information that is needed, from the application's point of view, to execute a particular handler or routine.<br>In a preferred embodiment, a command consists of an action and a context, with the context capturing parameters of the action. For example, (direction, {home}) can be a command made up of the action "direction" and the context consisting of a single parameter "home".<br>A command in the framework is different from a natural language sentence (voice command) spoken by a user of the application. Instead, it is a structured, actionable entity amenable to program processing without further translation or handling. |
| common action | This is an action that might be used in a variety of applications. For example, "navigation" might be pertinent to any number of applications. The framework provides support on common actions so that the developer does not have to redo the work on natural language understanding that has already been done. |
| context | A list of parameters and their values.<br>A context may contain built-in or reserved parameters. There may be some value assigned to the confidence of speech recognition, and error handling may be included as well. The framework engine may assign values to parameters based on descriptors.<br>Types can be a simple kind of descriptor, when there is no ambiguity (e.g., two different types of parameters, such as time and address). However, when there is ambiguity (e.g., a "from" address and a "to" address), the framework engine may assign the parameters in an arbitrary order. Advanced descriptors may be used to provide semantic guidelines for parameters, e.g., telling between a "start date" and an "end date", or telling between "the 1st person" and "the 2nd person". |
| developer | An application software writer who creates source code and compiles it into applications that run on the UE. Also referred to as a programmer. |
| framework | An application development environment that includes the access to a backend speech recognition engine and/or NLP library and associated tools for utilizing them. |
| intent | Synonym for "command" defined above. It reflect the intent of a user to execute a particular routine in an application. |
| NLP library | Natural language processing library that contains knowledge about grammar for natural language sentences that correspond to supported common actions, as well as knowledge for building grammar for natural language sentences that correspond to uncommon actions defined though framework APIs. This can be a third-party product that is referenced by the framework.<br>This library for natural language understanding can be accessed through routines or API of the framework, which helps developers make their applications voice enabled in a simple manner. |
| speech engine | A product (here a third-party product) that provides routines for converting spoken words into language that a computer understands, i.e., computer-readable text and intents. The speech engine can be closely-coupled with parts or all of the NLP library. |
| stage | A way to organize voice user interface within an application. Every stage has a designated set of allowed actions. |
| UE | User equipment.<br>Any user device comprising a user interface. |
| UI | User interface (voice, touch, or other). Also, GUI is a graphical user interface. |
| uncommon action | This is an action that is not predefined in the framework, which, for practical reasons, only includes a finite number of predefined actions. The framework provides an API for developers to define custom uncommon actions for their applications. |

The approach described herein is different from adding voice commands to existing GUI components, where the organization of voice commands follows exactly the GUI structure. In the approach described herein, developers may build a voice UI that is separate and orthogonal to the GUI as needed. This allows the development of a UI that is optimized for voice control, as opposed to just adding voice input to an existing UI optimized for touch. Nonetheless, it is straightforward to apply the approach described herein to develop a voice UI following an existing GUI structure, if that is desired.

The approach described herein does not require programmers to define grammar on common actions predefined by the framework. It uses the NLP library to capture knowledge about synonyms (e.g., "buy", "I'd like", "give me", etc), alternative ways to say things (e.g., "left we go", "go left"), and different combination and permutation of parameters in the context (e.g., for a ordering a pizza, the order of size, crust, topping in the voice command). Although the framework generally relies on a backend speech recognition engine and NLP library (common to all applications) to work, a custom engine specialized for any specific application can be assembled during an optional engine optimization process, during which the framework backend constructs a custom speech recognition engine based on all the allowed voice commands of the application.

The framework provides programmatic support for handling ambiguous and/or partial input, such as a missing parameter (E.g., "I'd like to share" (missing parameter: Facebook or Twitter)) or a missing command (e.g., "I'd like John to see this" (missing command: email or text)). APIs are provided in the framework for developers to trigger built-in routines for resolving ambiguity and/or partial input without having to implement the actual mechanisms from scratch.

To implement voice control in an application, the application must make use of a speech recognition engine (provided by a third party, for purposes of this application). This engine takes speech input and translates them into structured, actionable commands (intents). In order for this to work, the speech recognition engine has to have a well defined grammar (or an equivalent entity that captures knowledge about natural language understanding in the context of the application) for the application, i.e., a set of all the words, phrases and sentences that can be accepted as commands in the application.

If the grammar is very strict, e.g., a word "find" followed by an address parameter, it will only recognize that specific kind of sentences, but not something equivalent in natural language—e.g., it will not recognize similar sentences started with "navigate to" or "go to".

In addition, commands might have a number of parameters. For example, an "order pizza" command might have three parameters: size, topping, and crust. In a strict grammar, if the user states the order of the parameters different than that specified by the developer, then the application will not be able to recognize the parameters. Things get extremely complex when trying to define a grammar to capture natural language commands. Generally, it is very difficult for programmers to define good grammars for natural language commands, since it requires extensive knowledge and work on natural language understanding. Ideally, programmers would want to focus on business logic of the applications instead.

Thus, what is provided herein is that grammars (and/or other applicable mechanism for natural language understanding) for commonly used domains are built by experts and organized in a speech recognition and/or NLP library, to be accessed by application developers through the use of a programming framework. A developer specifies what code should be executed when a particular command in the domain is triggered, and the framework provides code for sending voice input to the proper engine based on the pre-built grammar of the relevant domains, obtaining an action-context pair back from the engine, and/or triggering the code specified by the developer.

For example, if a developer wants to have an application that handles "geographic navigate" functionality and "report" functionality, it is desirable to provide the developer with a framework that allows the developer to specify declaratively that if the navigate action is triggered, the application should execute a particular piece of code. And if, e.g., the "report" function is triggered, then a different piece of code is executed. Specifically, the developers work with actions such as "navigate" and "report", rather than having to compose grammars to capture all acceptable natural language sentences to the same effect (e.g., "drive to . . . ", "go to . . . ", "navigate to . . . ").

The NLP library's support on common actions can be viewed as a predefined set of voice UI components. Developers may simply pick those of interest to the application and reuse them.

For a specialized domain where no common voice UI component is provided, the framework provides a mechanism for the developer to define custom commands. In case of conflict between custom commands and common actions supported by the library, one of a few conflict resolution mechanisms may be used. For example, the developer could expressly override the common action, or could chain a follow-on to execute before or after the common action.

Thus, at a high-level, the developer describes what code to execute when specific actions are triggered using an API of the framework, the framework provides code to access the backend engine and triggers corresponding application code based on the intent returned from the backend engine, and the backend engine translates speech input into intents.

In case of uncommon actions, the framework provides an API to define new custom commands. For example, in the exemplary pizza ordering application discussed above, a three-parameter action "order" may be specified by the developer along with its parameters (crust, topping, size). Note that the developer is not composing a grammar from scratch for the speech engine. Instead, the developer is declaring actions and parameters using a framework API. The framework will generate a grammar automatically to capture all possible combinations of parameter sequencing in which the end-user can speak them. Similarly, the framework can identify at runtime if a parameter is missing or erroneous and/or trigger routines to ask the user for further input automatically, if the developer uses the relevant API in their application.

When defining uncommon actions, in one situation, types might be used to specify and identify a particular parameter (e.g., an address is different from a date). However, if there are multiple parameters needed of a same type (e.g., a "from" and "to" address for a direction finding function), then the type recognition scheme does not work, and another mechanism must be used, such as a more accurate descriptor.

With the framework provided herein, the developer simply specifies the action (for common or predefined actions) without having to specify how the action is represented in natural language.

Figure 2:
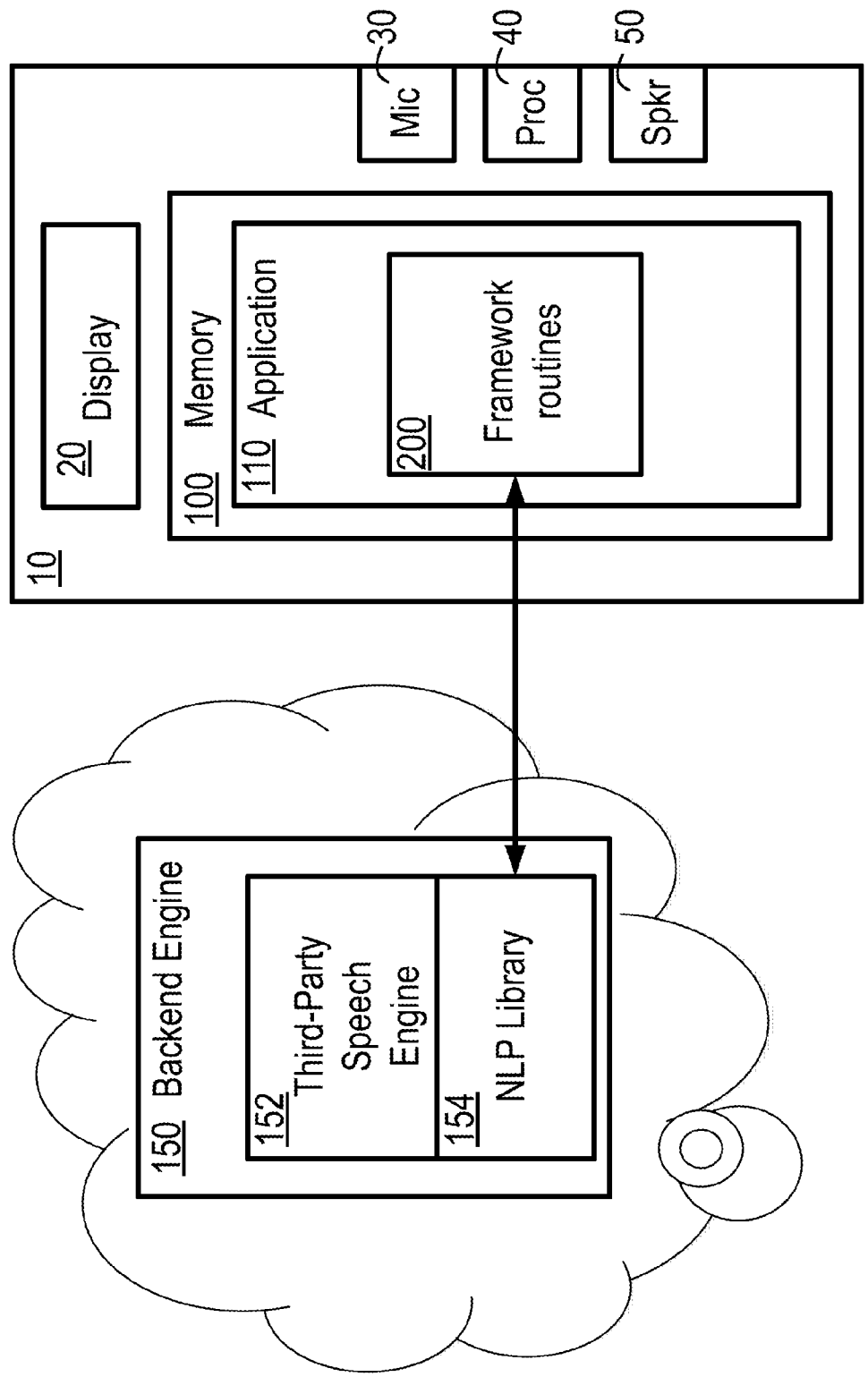
FIG. 2 is a block diagram of an exemplary UE and service according to an embodiment that implements the voice application on the UE and the backend engine/library on the Cloud.

FIG. 2 is a basic block diagram illustrating an exemplary user equipment (UE) 10 device and an exemplary backend engine 150 on the Cloud according to an embodiment of the invention. In this diagram, a UE 10 may be a smartphone, PDA, tablet computing device, laptop computing device, personal computer, or other computing device. The backend engine 150 may be situated on a Web server or other hosting services.

The UE 10 preferably comprises a display 20 that serves as a user output device for applications. In a preferred embodiment, the display 20 is also a touch screen that also serves as a user input device for applications. As various applications are run, and as various stages within the application are activated, different screens may be displayed to the user on the display 20.

The voice controlled UE 10 comprises a microphone 30 via which voice commands are input. The UE 10 may also preferably comprise a speaker 50, although a speaker is not essential. The device comprises a processor 40 (which actually may be made of a plurality of separate processors having various responsibilities in the device), to execute various applications, library routines, system code, etc. The UE also comprises a memory 100 that contains, among other things, storage for applications 110. Applications build using the framework have framework routines 200 embedded therein, which communicates with the backend engine 150 at runtime. The backend engine 150 comprises a speech recognition engine 152 and an NLP library 154. In one embodiment, the NLP library 154 may be closely coupled with the speech recognition engine 152 so there may be no distinction between the two from a developer's perspective.

Figure 2A:
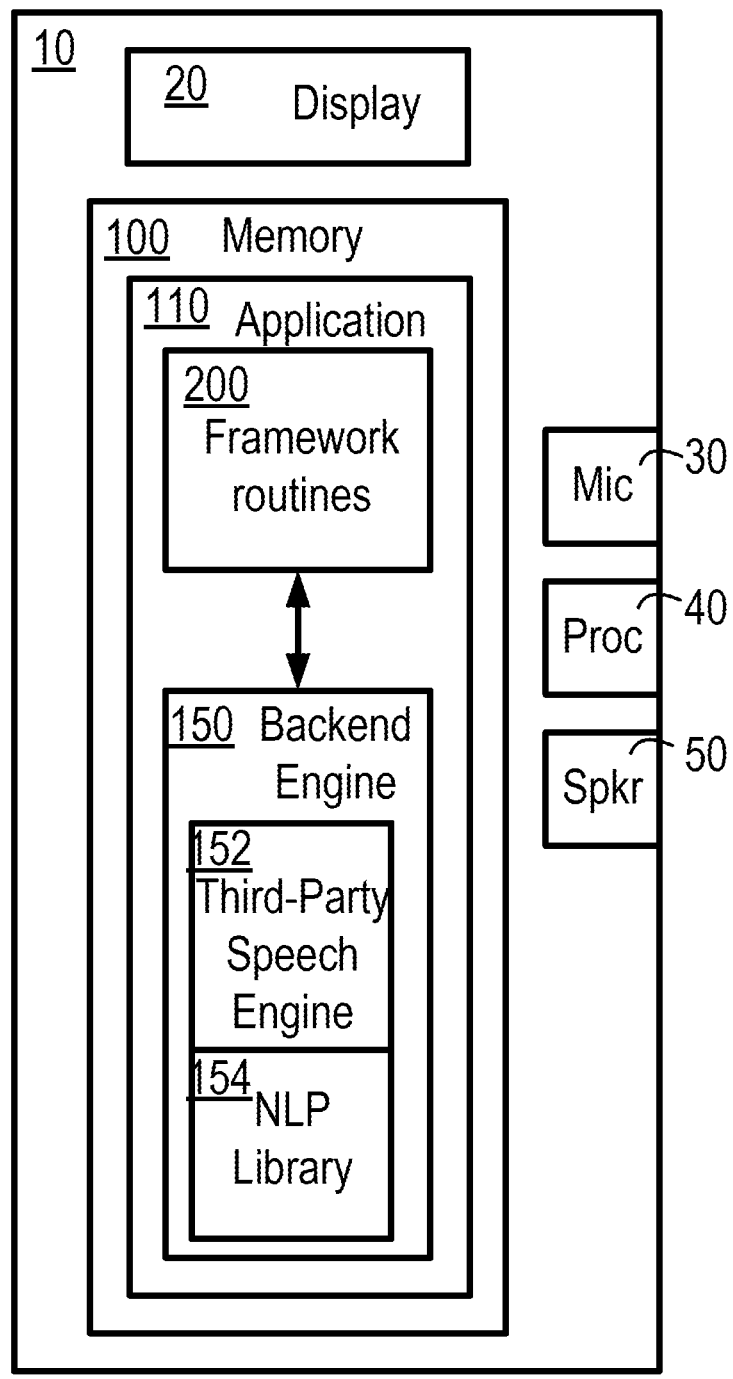
FIG. 2A is a block diagram of an exemplary UE according to an embodiment that implements the voice application on the UE.

FIG. 2A shows an alternative embodiment to that shown in FIG. 2 in which a custom speech/NLP engine 152, 154 is included in the application 110 and deployed as part of the application 110 on the UE 10. In this case, no Cloud service is needed for hosting the speech/NLP engine 152, 154. An embodiment that is a hybrid of FIG. 2 and FIG. 2A can be applied as well, where a custom engine 150 is deployed as part of the application 110 and at the same time a full-blown engine 150 is deployed on the Cloud to complement the former. For example, the custom engine 150 can be small and fast in supporting selected voice commands, whereas the engine 150 on the Cloud can be bigger, less responsive (since its performance is dependent on the network), but support a complete set of voice commands.

Among other things, the framework provides an API for voice-enabling applications based on actions. The following tables provide exemplary actions that may be used to form the framework. The actions may be organized according to vertical actions (those that are common across multiple domains; examples are given in Table 1) and horizontal actions (those that are specific to a single domain; examples are given in Table 2).

TABLE 1

Exemplary Vertical (Domain Independent) Actions

| Verticals | Examples of Speech Input |
|---|---|
| Search | Find . . . |
|  | Search for . . . |
|  | Tell me about . . . |
| Share | Tell my friends . . . |
|  | Share with . . . |
|  | Forward to . . . |

TABLE 1-continued

Exemplary Vertical (Domain Independent) Actions

| Verticals | Examples of Speech Input |
|---|---|
| Navigate (application) | Go back |
|  | Go home |
|  | Edit settings |
| Help | How do I use . . . |
|  | What is . . . |
|  | What can I say? |
| . . . | . . . |

TABLE 2

Exemplary Horizontal (Domain Dependent) Actions

| Horizontals | Topics | Examples of Speech Input |
|---|---|---|
| Navigation (geographic) | Directions | How do I get to . . . Go to . . . |
| Social | Status update | Tell my friends . . . Tell everybody . . . |
|  | Friendship | Add friend . . . |
| Shopping | Purchase | Buy it Check out Make purchase |
|  | Watch list | Watch this |
| Reader (books, news, etc.) | Comment | Leave comment . . . Post . . . |
|  | Subscription | Follow |
| . . . | . . . | . . . |

TABLE 3

Exemplary Action Details Provided by the Framework

| Categories | Action ID | Parameters | Meaning | Examples |
|---|---|---|---|---|
| Vertical | ACT_V_SEARCH | P1: Object of Search | Search for [P1] | "Find [P1]" "Search for [P1]" "Tell me about [P1]" |
|  | ACT_V_SHARE | . . . | . . . | . . . |
|  | . . . | . . . | . . . | . . . |
| Horizontal: Navigation | ACT_H_DIRECTION | P1: source address P2: target address | Get directions from P1 to P2 | "Give me the direction from [P1] to [P2]" "How do I get to [P2]?" (P1 set to CURRENT_ADDR) |
|  | ACT_H_ZOOMING | . . . | . . . | . . . |
| Horizontal: Social | . . . | . . . | . . . | . . . |
| . . . | . . . | . . . | . . . | . . . |

The framework may provide documentation on supported actions, such as those shown in Table 3. An Action ID (e.g., ACT_H_DIRECTION), possibly quantified by category (e.g., Navigation), is used to uniquely identify actions. Parameters (e.g., P1, P2) list all parameters associated with a particular action. Meaning describes the intention behind the action and Examples details what natural-language sentences are considered as commands for the action. Note that an action may have multiple interfaces—for example, navigation may take either an address or a person's name (which would be further translatable or resolvable into an address).

The framework supports a set of actions commonly used in voice control, such as geographic navigation, calling, texting, payment, camera operations, etc. The support can be expanded in a backward-compatible way—i.e., as new common actions are added, the framework can still support all of the original actions. The framework may also be standardized and/or backed by a standard as well.

To voice-enable an application using the framework, it is essentially for the developer to associate actions with code that handles them. The framework provides an "action handler registration" API for such purposes. A version of the API is illustrated as follows in a simplified format for ease of understanding:

RegResult addActionListener(Action a, Handler h)

The above specifies the interface of an "addActionListener" routine in Java pseudo code. RegResult is a type for describing the return result of the routine. It is usually "void" (no result expected) or "int" (integer value indicating error code, etc), but can be any type as needed. "Action a" declares a parameter a of type "Action", where Action is the type describing actions as defined by the framework. "Handler h" declares a parameter h of type "Handler", where Handler is the type describing action handlers (code that handles actions) as defined by the framework.

A developer may use the API to register listeners (code) for actions of interest. By way of example, the following pseudocode illustrates how this may be done:

```
addActionListener(ACT_V_SEARCH, function (Context c) {
    get parameter from context c;
    get map based on parameter;
    render map on screen;
    render voice prompt;
    }
)
addActionListener(ACT_H_DIRECTION, function (Context c) {
    get parameters from context c;
    get direction based on parameters;
    render direction on screen;
    render voice prompt;
    }
)
```

The first code block above calls addActionListener to associate the action ACT_V_SEARCH with an anonymous function. It essentially tells the framework to use the anonymous function to process voice commands related to the action. The second code block above serves a similar purpose on the action ACT_H_DIRECTION.

The above two code blocks use common actions predefined in the framework. In one embodiment, a developer may also define custom actions for use in action handler registration. Various methods may be used for defining custom actions, from simple (verb, parameters) pairs (as is used in the following sample code) to existing standards for specifying complete grammar (e.g., Speech Recognition Grammar Specification (GRXML), Java Speech Grammar Format (JSFG)).

```
myVerbs = ["report", "share"];
myParams = ["heavy traffic", "moderate traffice", "light traffic"];
myCommand = new Command(myVerbs, myParams);
voiceControl.addIntentListener(new Action(myCommand), function
    (Context c) {
        update server with traffic condition in context c and location;
        render voice prompt;
    }
)
```

The framework may provide the action registration API in different interfaces, such as the following:

RegResult addActionListener(Stage s, Action a, Params p, Handler h)

The API may consist of multiple function interfaces using a subset or all the above list parameters. The Action and Handler parameters serve the same purpose as discussed previously. The Stage parameter specifies when to listen to the action of interest. For example, the developer may define two stages in the application, with one stage accepting voice commands related to geographic navigation and another accepting voice commands related to social networking. The Params parameter specifies mandatory parameters of the voice command. The framework can provide code to ask the user for missing parameters. For example, if an address parameter is listed as mandatory for a navigation action in the API call, yet at runtime the user speaks a navigation command without a target address, then code from the framework can be triggered to ask the user for the target address.

Figure 8:
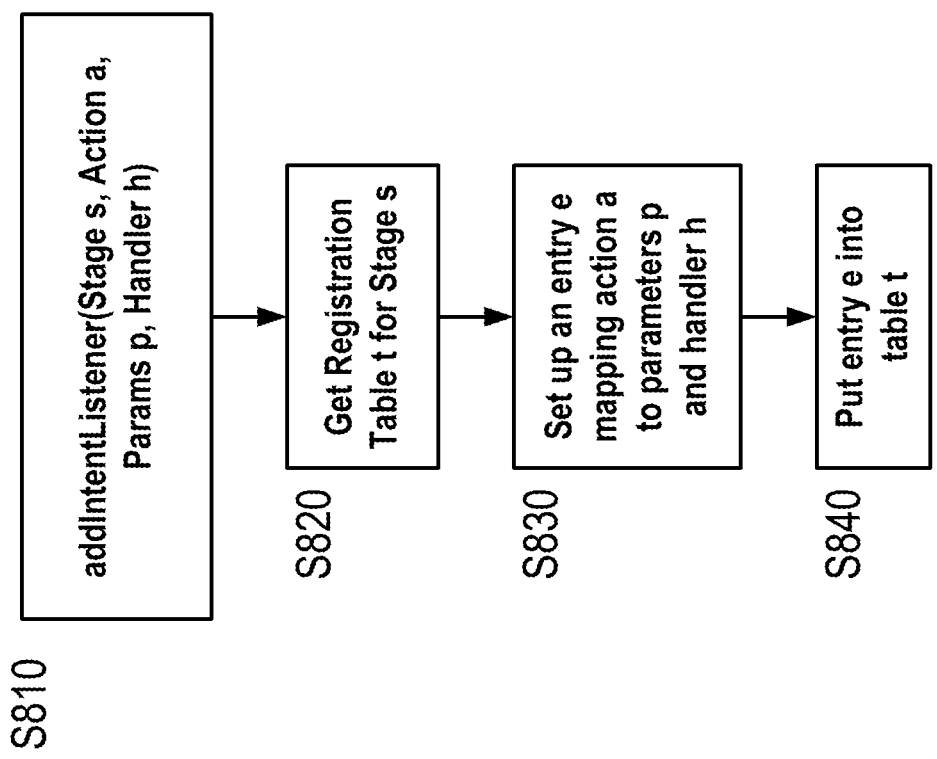
FIG. 8 is a flowchart illustrating the implementation of intent handler registration, according to an embodiment.

FIG. 8 is a flow chart of one embodiment of the implementation of the action registration API S810. In one embodiment, the framework sets up a registration table for every stage declared by the developer. During action registration, the framework obtains the table for the stage S820, sets up an entry mapping the action to the parameters p and handler h S830, and puts the entry into the table S840.

The framework may provide variants of the action registration API. Some may allow one to register a handler for an action in multiple stages (e.g., it would be useful for a help command to be available in all stages). Some may register a handler for all unhandled actions (e.g., to implement a behavior for unexpected voice commands). Some may provide default handlers (e.g., to use a default warning for unsupported commands). Although an application may be expecting a particular voice input (e.g., waiting for an address or direction in a map application), and thus the voice input can be considered synchronous, it is also possible to view the handling as asynchronous, possibly through the registration of the handlers in multiple stages of the application, or even through system/operating system-level "stages". For example, it may be possible for a user to invoke a 911 emergency call regardless of the application input that is being expected. Some voice commands can be accepted at any time during the application, but the developer still has to anticipate them to be globally acceptable. The framework provides an API for the developer to register certain commands in multiple or all stages, which can be supported from a technical point of view given the registration support for individual stages.

The developer may make as many calls to the action registration API as needed so that all allowed voice commands are handled. At runtime, the framework constructs a registration table for every stage connecting actions to handlers. The table, in turn, is used at runtime by the framework for command dispatching based on the user's speech input.

Figure 3:
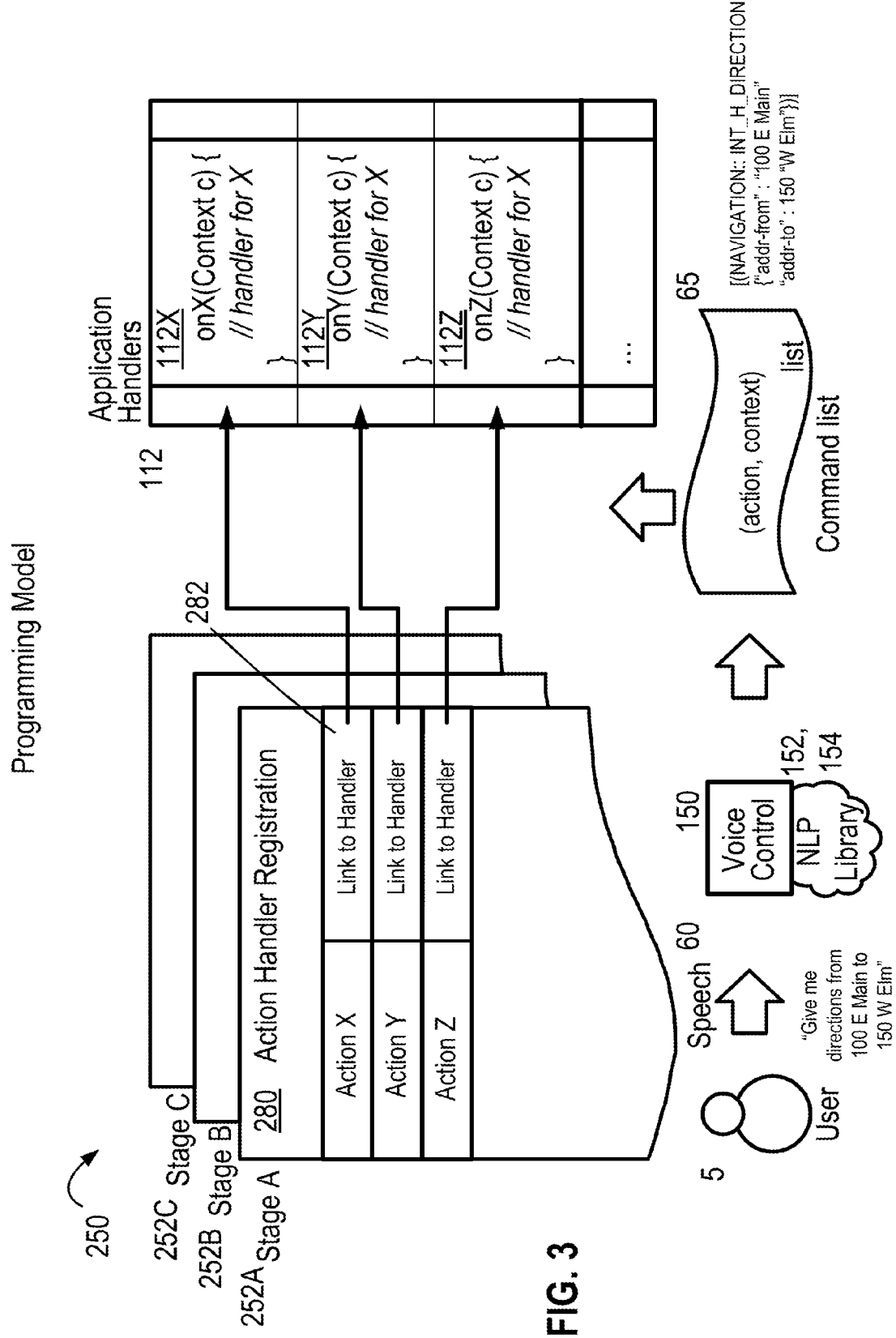
FIG. 3 is a programming model block diagram.

FIG. 3 illustrates an exemplary mechanism in the form of a registration table 250 that may be used for invoking the appropriate application handlers 112 in a given application. At any particular point in time, the application may be in a particular stage 252. In an example, the exemplary navigation application is in Stage A 252A in which it is anticipating some set of possible inputs from the user 5.

In FIG. 3, when the user 5 is executing the exemplary navigation application, he speaks a voice command 60 that the developer has designed to be a part of the voice-controlled navigation application. The user might say, "Give me directions from 100 E Main St. to 152 W. Elm St.". The voice control backend engine 150, including the NLP routines 154 and speech engine 152, interpret the speech and produce a command or a command list (if multiple commands are present) 65 comprising an action (Action X="Give me directions" command) along with the context. Based on the registered actions for the application, the action is located in the registration table 250 and control is then passed to the appropriate handler 112 that is pointed to by a link 282. The context is then used to instantiate the parameter of the handler when the handler is executed. FIG. 4 shows that a context is a list of entries 260. Each entry can comprise a name N 262 and a value V 264.

By using this form of registration, it is possible to make the registration dynamic, i.e., the appropriate handler can be changed on-the-fly at run-time. Furthermore, a registration can be temporary (e.g., for one-time or limited duration use).

Figure 9:
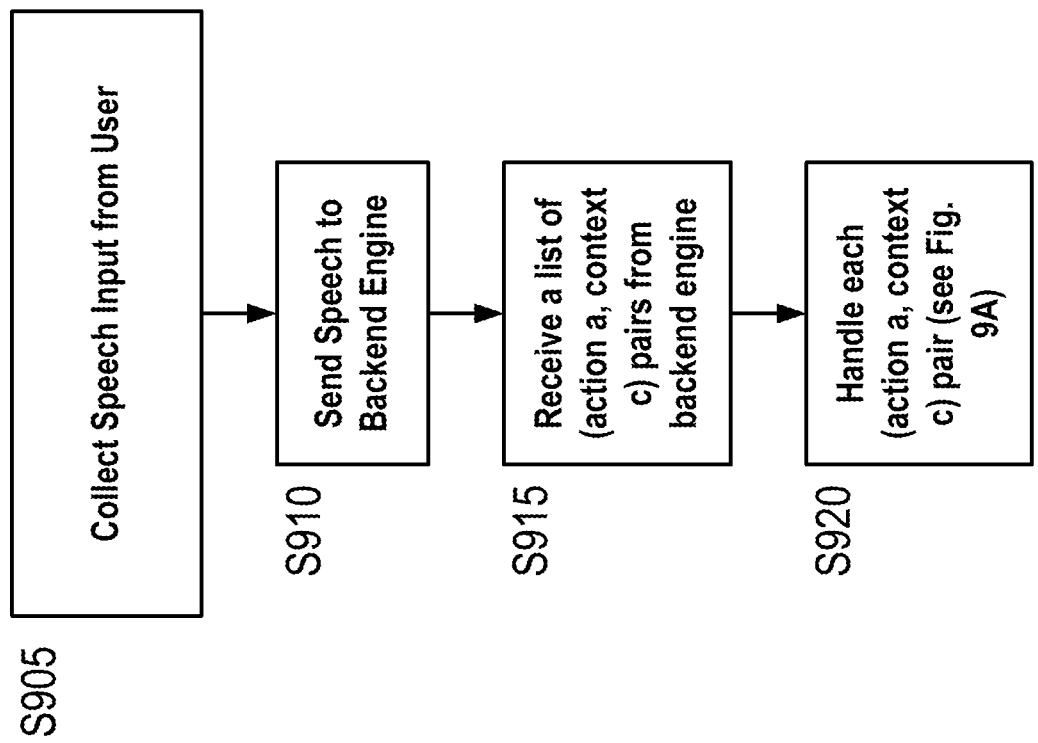
FIG. 9 is a flowchart illustrating one part of the implementation of voice command dispatching, according to an embodiment.
Figure 9A:
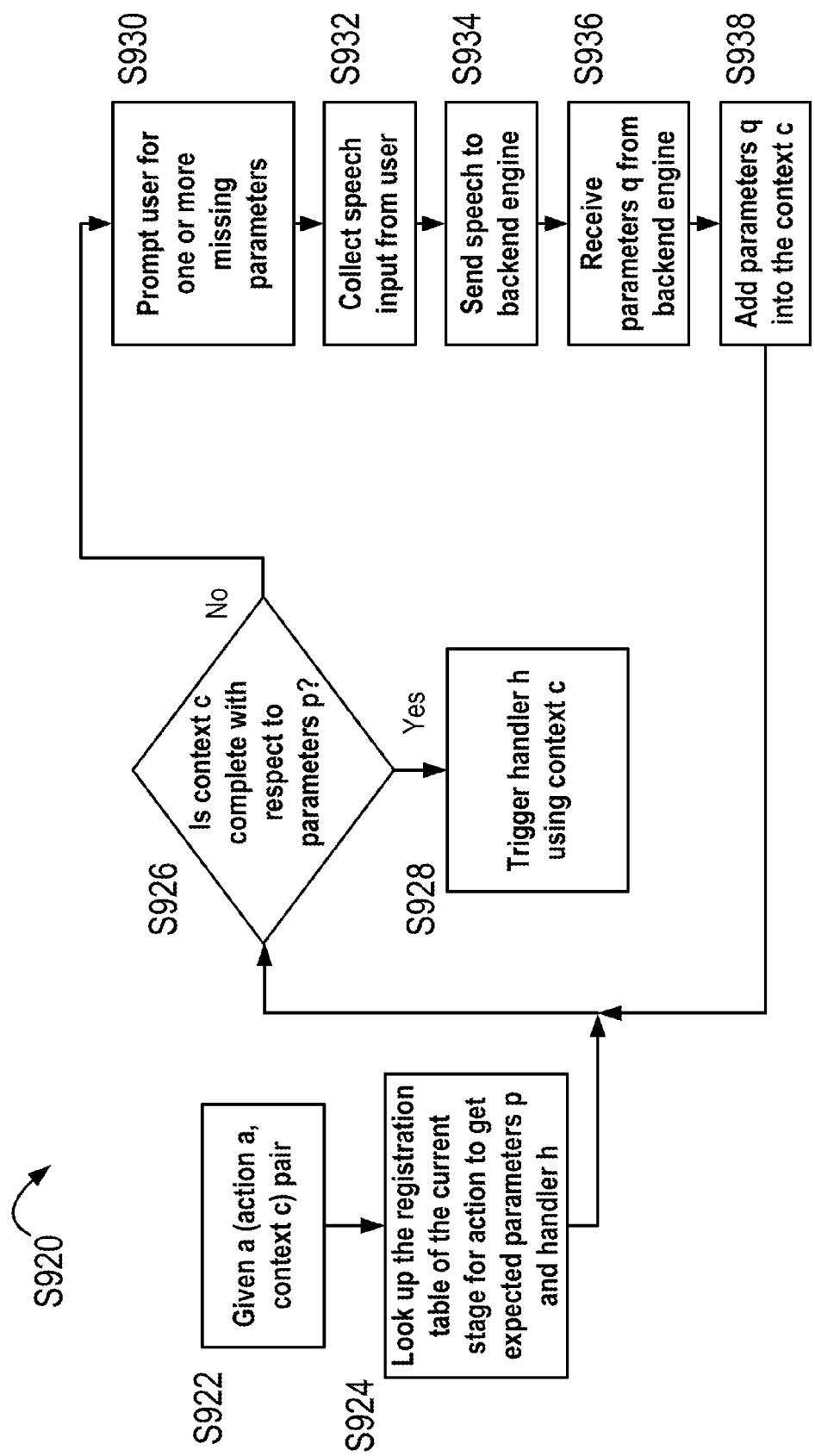
FIG. 9A is a flowchart illustrating the other part of the implementation of voice command dispatching, according to an embodiment.

FIGS. 9 and 9A together show a flow chart for one embodiment of voice command dispatching. It collects speech input from the user S905, send the speech to the backend engine S910, receives an answer from the backend engine S915, and tries to assemble a context according to the user's requirement before triggering the corresponding handler.

To get speech input from the user, the developer may use APIs provided by the framework. One embodiment of such an API is a routine to be called when listening starts, e.g., startListeningToVoiceCommand( ). The routine may take a stage parameter specifying what commands are expected. The implementation of the routine triggers code to record user voice input. The recording stops when a specific routine is called (e.g., endListeningToVoiceCommand( )) or a timeout is reached.

The framework sends the speech to the backend engine for recognition S910 after packaging it in an appropriate format. The framework then receives an answer back from the backend engine in the form of a list of action-context pairs S915, which are handled one by one S920. For example, the first command may be dispatched while the remaining command(s) is (are) buffered. Buffered commands may be processed when the current handler finishes execution.

In FIG. 9A, given one action-context pair S922, the framework looks up the registration table for the current stage to get expected parameters and handler S924. If the context received from the backend engine is complete with respect to the expected parameters S926, the handler is triggered using the complete context S928. If not, the framework prompts the user for the missing parameters S930, collects the missing parameters from the user S932.

The framework may provide an API for obtaining user's voice input without going through action registration. This provides a lightweight voice control mechanism useful for simple interactions with the user. In one embodiment, this API takes a prompt and a list of context entries, e.g., ask(String prompt, Context c). The implementation of this API prompts the user for specific input (one or more items) S930 and collects the speech input from the user S932. It sends the speech to the backend engine S934, receives the missing parameter(s) from the backend engine S936, and adds the parameter into the context S938 prior to returning to check if the context is complete S926.

As a summary, the framework can provide a combination of the following APIs:

Setup and configuration, e.g., framework initialization, stage setup, backend engine configuration.

Start and/or stop listening to voice command. This can be used to customize the trigger of voice control.

Custom semantic mappings, e.g., map={map, find, go to, . . . }

Action handler registration, including special handlers for error and exception handling. Some common error/exceptions are: API set up related (e.g., no action registered, library not set up, bad API arguments, etc.); speech related (e.g., too long, bad voice, no connection, no match); and interrupt related (e.g., abort)).

Lightweight voice control (e.g., ask(prompt, context)).

Stage setup and transitioning (e.g., startStage(stage))

Utilities, e.g., text-to-speech API for voice interaction, ability to interrupt the current task with specific voice commands.

Figure 5:
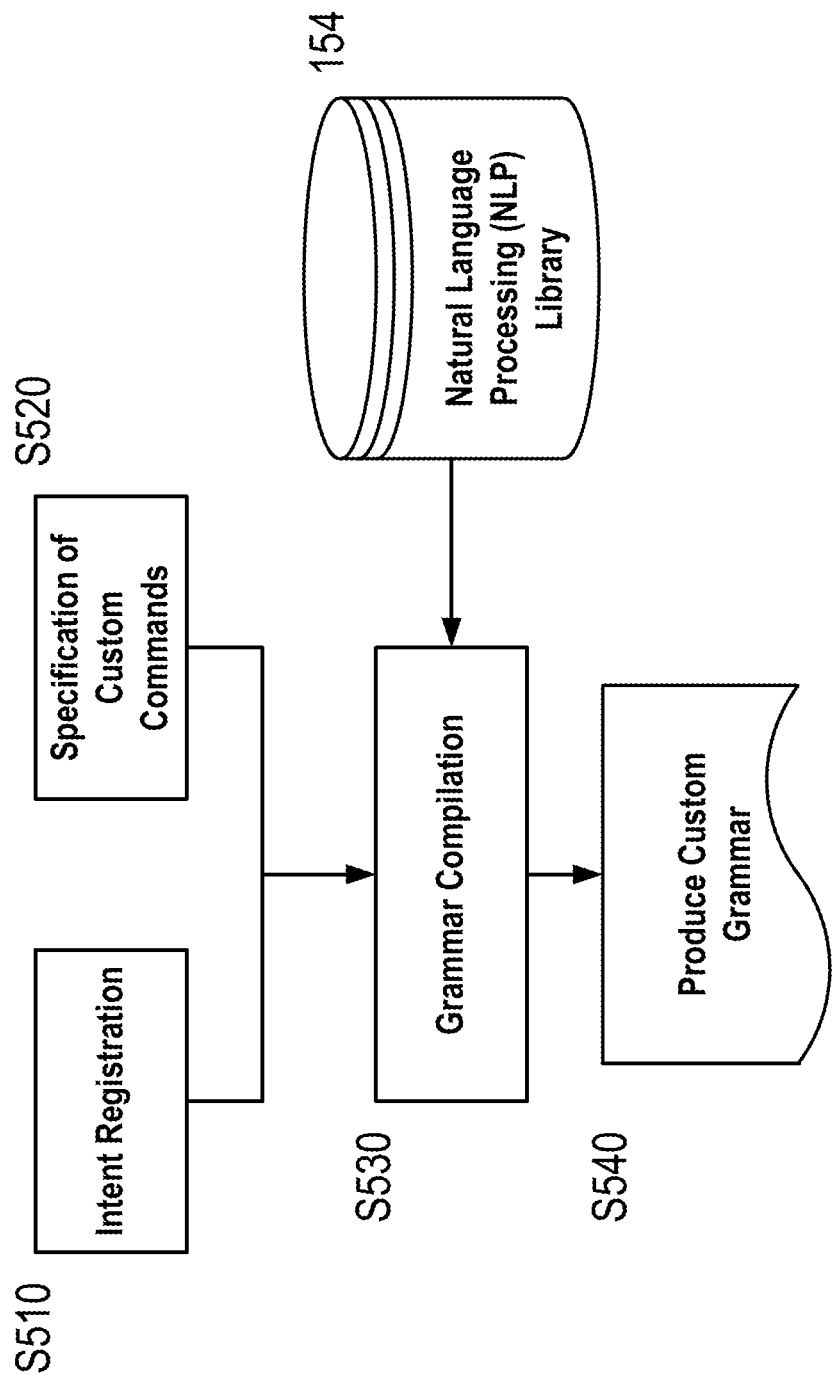
FIG. 5 is a flow diagram illustrating an optional grammar generation process.

The framework may facilitate an optional process of grammar compilation, as illustrated in FIG. 5. The process works based on the action handler registration S510 (280) and the specification of custom commands S520 provided by the developer through framework APIs during development. The grammar compilation process S530 collects actions from the action handler registration S510 and composes a custom grammar S540 for them based on the NLP library 154. The grammar compilation process S530 further collects specification of custom commands S520 and expands the custom grammar S540 accordingly. The resultant custom grammar S540 can be used at runtime to guide a speech recognition engine.

Ambiguity may arise during grammar compilation. Errors may be raised accordingly so that the developer may then chose to: change allowed actions, change specifications of uncommon actions, specify priorities of actions, and/or defer the resolution of ambiguity until runtime (e.g., by asking the user). In the latter approach, the speech recognition engine may use a special action to indicate ambiguity and the framework may provide routines to handle them accordingly.

Figure 6:
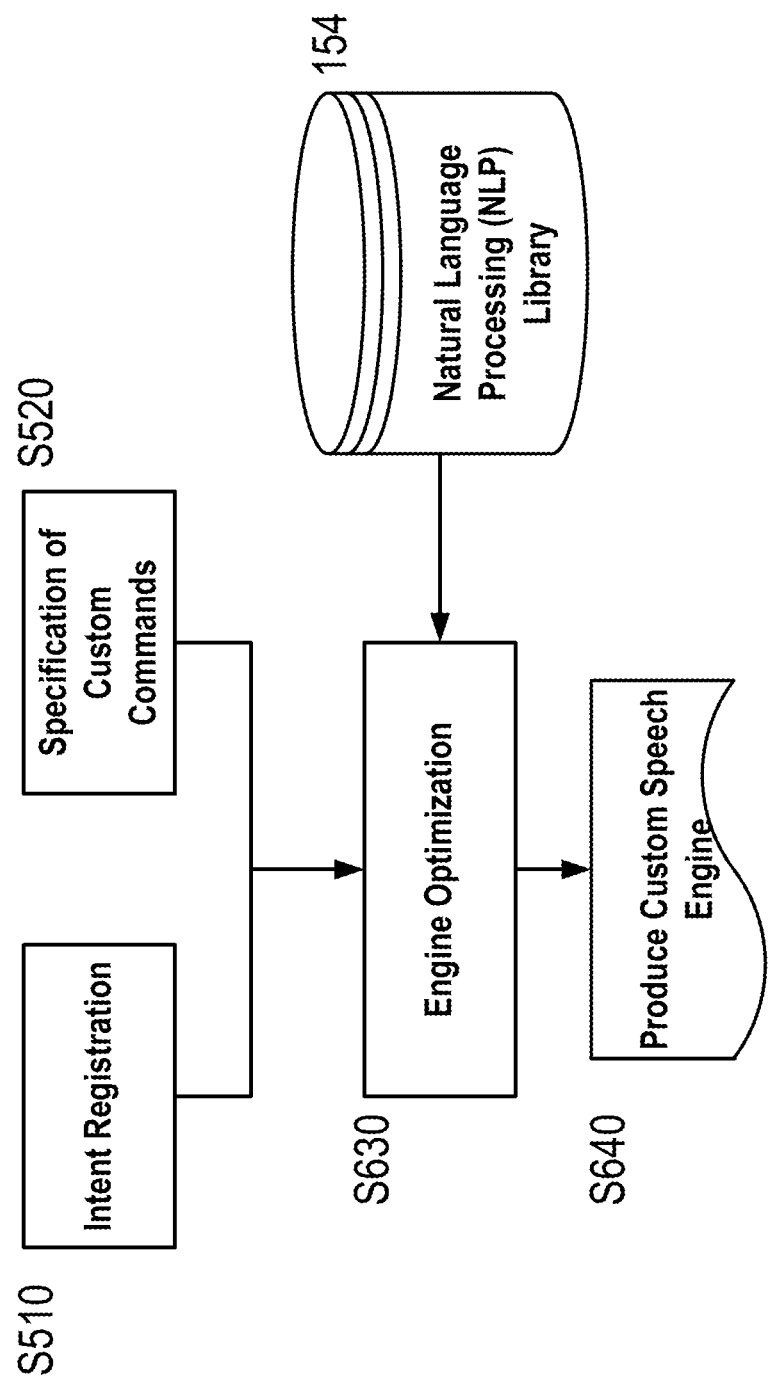
FIG. 6 is a flow diagram illustrating an optional engine optimization process.

The framework may facilitate an optional process of engine optimization S630, as illustrated in FIG. 6. The situation is similar to the process of grammar compilation shown in FIG. 5, except that the resulting produced custom speech engine S640 is a self-contained speech recognition engine to be used at runtime. The custom speech engine S640 can be provided either on the Cloud or shipped to the UE 10 together with the application.

Figure 7:
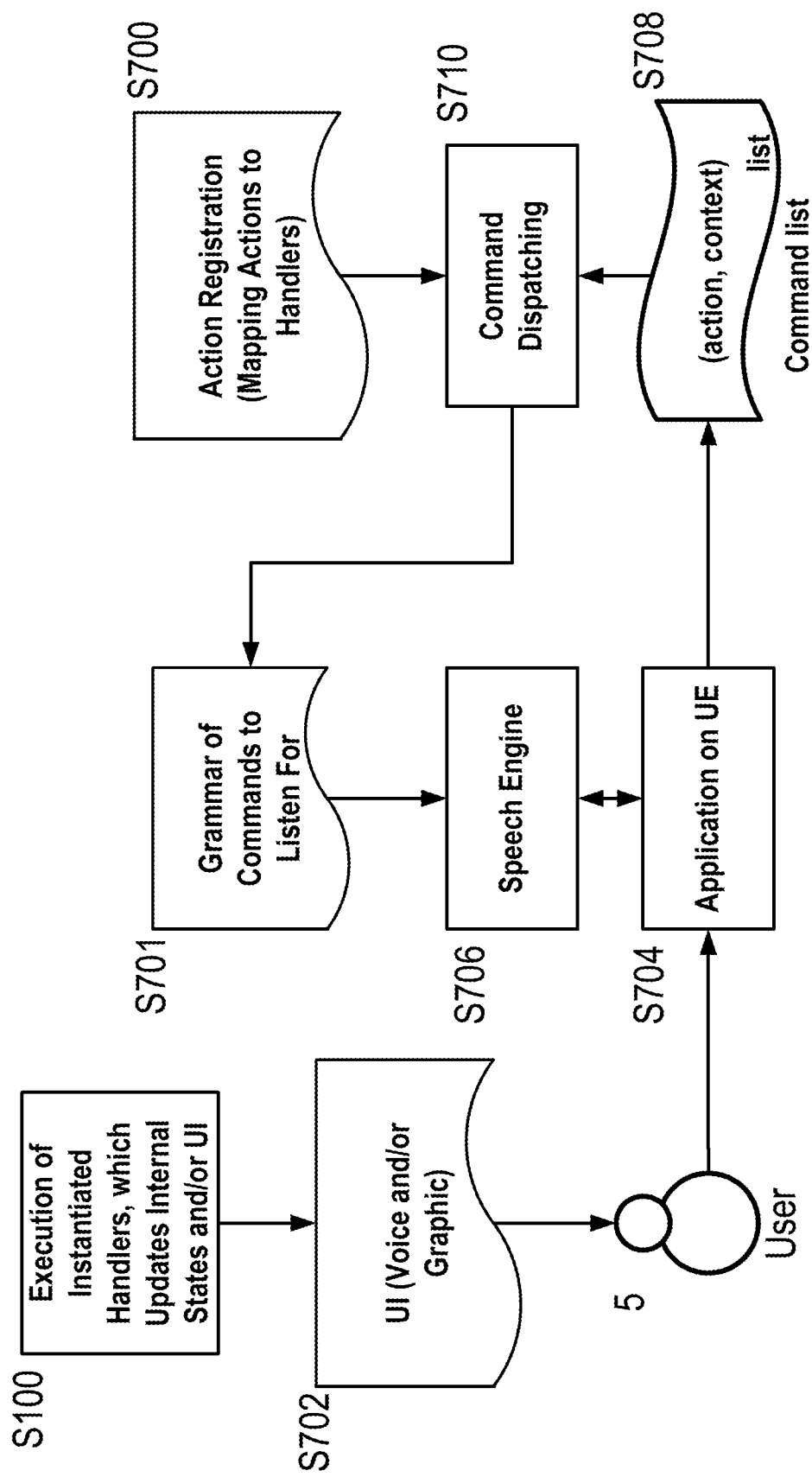
FIG. 7 is a diagram illustrating the steps and elements used in an application that is built using the framework, according to an embodiment.

At run time, as shown in FIG. 7, the action handlers are registered S300 at application initialization time. This involves associating addresses of application handlers along with the actions as described previously. Once the application initialization is complete, and the user is running the application, the application will be in a particular state and expecting user 5 input via either a touch screen input or voice input S302. For example, the exemplary navigation application might be expecting, as one possibility for input, the command, "where am I?". If the user 5 issues this voice command to the Application S304, the speech engine translates S306 this inquiry into an action S308 associated with a particular context of parameters for the action, if any, the action having been registered when the application was initialized S300. The action/context are then dispatched by the command dispatching S310.

As noted above, the speech engine may be a standard component obtained from third parties and based on existing art. If the optional grammar compilation process is used, the speech engine would be guided by a custom grammar during recognition. If the optional engine optimization process is used, the speech engine would be the custom engine. If neither is used, the speech engine may use a standard grammar that characterizes all actions supported by the framework. In the latter case, the application, via the framework, may send a list of allowed actions to the speech engine during initialization or together with a recognition request to narrow down the list of possible actions to recognize, although this is not essential.

The command dispatching routine S310 determines the address (pointer) of the appropriate handler for handling the command and causes the application to execute the code at the location pointed to. Its internal workings were discussed above in FIGS. 9 and 9A.

The system or systems described herein may be implemented on any form of computer or computers and the components may be implemented as dedicated applications or in client-server architectures, including a web-based architecture, and can include functional programs, codes, and code segments. Any of the computers may comprise a processor, a memory for storing program data and executing it, a permanent storage such as a disk drive, a communications port for handling communications with external devices, and user interface devices, including a display, keyboard, mouse, etc. When software modules are involved, these software modules may be stored as program instructions or computer readable codes executable on the processor on a computer-readable media such as read-only memory (ROM), random-access memory (RAM), CD-ROMs, magnetic tapes, floppy disks, and optical data storage devices. The computer readable recording medium can also be distributed over network coupled computer systems so that the computer readable code is stored and executed in a distributed fashion. This media is readable by the computer, stored in the memory, and executed by the processor.

All references, including publications, patent applications, and patents, cited herein are hereby incorporated by reference to the same extent as if each reference were individually and specifically indicated as incorporated by reference and were set forth in its entirety herein.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The embodiments herein may be described in terms of functional block components and various processing steps. Such functional blocks may be realized by any number of hardware and/or software components that perform the specified functions. For example, the described embodiments may employ various integrated circuit components, e.g., memory elements, processing elements, logic elements, look-up tables, and the like, which may carry out a variety of functions under the control of one or more microprocessors or other control devices. Similarly, where the elements of the described embodiments are implemented using software programming or software elements the invention may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the embodiments of the invention could employ any number of conventional techniques for electronics configuration, signal processing and/or control, data processing and the like. The words "mechanism" and "element" are used broadly and are not limited to mechanical or physical embodiments, but can include software routines in conjunction with processors, etc.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings. Expressions such as "at least one of," when preceding a list of elements, modify the entire list of elements and do not modify the individual elements of the list.

The use of the terms "a" and "an" and "the" and similar referents in the context of describing the invention (especially in the context of the following claims) should be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein are performable in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those skilled in this art without departing from the spirit and scope of the invention.

TABLE OF REFERENCE CHARACTERS 5 application user
10 user equipment (UE)
20 display
22 view on display
30 microphone
40 processor
50 speaker
65 user speech
65 command (action, context) list
100 memory
110 application 112 application handlers
150 backend engine
152 speech engine libraries, routines
154 natural language processing (NLP) library
200 voice application libraries, routines
250 registration table
252 stage of application
260 context entry
262 name
264 value
266 descriptor
280 action handler registration
282 link to handler

What is claimed is:

1. A method for enabling or enhancing a use of voice control in a voice controlled application (VCA) via a development framework, the method comprising:
providing in the development framework a plurality of framework action-context pairs wherein the development framework is stored in a memory of an application development device comprising a processor, the plurality of framework action-context pairs being configured to direct execution of the VCA, wherein each framework action-context pair has an action and a context that defines a list of parameters related to the action and respective value types of the parameters;
providing at least one of a voice recognition engine (VRE) or a natural language library to match each action-context pair with semantically related vocabulary;
generating automatically a grammar to capture knowledge about natural language understanding in the context of said VCA;
providing in the development framework a registration mechanism that forms an association between an action-context pair and a handler in the VCA, the registration mechanism such that when a voice input is received, the voice input is sent to a speech recognition engine based on said grammar to obtain an action-context pair from the plurality of framework action-context pairs and the action-context pair is used to select and trigger the handler in the VCA to execute the action intended by the voice input.

2. The method of claim 1, further comprising providing in the development framework:
a handler definition mechanism comprising types, classes, and interfaces or utilities that are usable to define the actions and the contexts of the action-context pairs, and associated VCA handlers; and
a dispatching mechanism comprising interfaces or utilities that are usable to look up a registration at runtime;
wherein the registration mechanism comprises interfaces or utilities that are usable to define a registration element to hold registrations at runtime.

3. The method of claim 2, wherein the registration element comprises a table, a hash, or registration mapping.

4. The method of claim 2, wherein the development framework is additionally provided with further utility mechanisms selected from the group consisting of:
setup and configuration mechanisms;
start and stop listening to voice command mechanisms used to customize a triggering of voice control;
custom semantic mappings;
special handlers, in the action handler registration, for error and exception handling;
lightweight voice control;
stage setup and transitioning;
a text-to-speech API for voice interaction; and
a mechanism for interrupting a current task with specific voice commands.

5. The method of claim 1, further comprising:
selecting, by an application developer, for the VCA, a plurality of application action-context pairs from the framework action-context pairs, that define voice control of the VCA, wherein each application action-context pair defines an action and a list of parameters related to the action and respective value types of the parameters;
associating an application handler of the VCA with each of the application action-context pairs; and
producing the VCA that uses the action-context pairs and associated application handler.

6. The method of claim 5, further comprising:
defining, by an application developer, a new application action-context pair not present in the framework action-context pairs;
defining an application grammar for the new application action-context pair using the natural language library to match the new application action-context pair with new semantically related vocabulary;
registering the new application action-context pair and associated grammar with the application action-context pairs; and
associating a new application handler with the new application action-context pair.

7. The method of claim 5, further comprising:
defining a new application grammar for a specific application action-context pair using the natural language library to match the specific application action-context pair with new semantically related vocabulary; and
registering the new application grammar with the specific application action-context pair.

8. The method of claim 5, further comprising:
executing the VCA on a user equipment (UE);
assigning VCA handler execution addresses to each of the application action-context pairs at run-time;
providing a voice input to the UE comprising verbal commands;
performing voice recognition (VR) and language parsing on the voice input by the device or on a networked cloud;
translating the voice input into a run-time action-context pair, wherein the run-time context contains a list of parameter values related to the action; and
executing the VCA handler at the VCA handler execution address associated with the run-time action-context pair from among the assigned VCA handler addresses.

9. The method of claim 8, further comprising:
dynamically assigning a new VCA handler execution address with a previously assigned application action-context pair.

10. A non-transitory computer program product, comprising a computer usable medium having a computer readable program code embodied therein, said computer readable program code being executable by a processor to implement a method for enabling or enhancing a use of voice control in a voice controlled application (VCA) via a development framework, the method comprising:
providing in the development framework a plurality of framework action-context pairs usable in a memory of an application development device comprising a processor, that serve to direct execution of the VCA, wherein each framework action-context pair defines an action and a list of parameters related to the action and respective value types of the parameters;

providing at least one of a voice recognition engine (VRE) or a natural language library to match each action-context pair with semantically related vocabulary; and generating automatically a grammar to capture knowledge about natural language understanding in the context of said VCA;

providing in the development framework a registration mechanism that forms an association between an action-context pair and a handler in the VCA, the registration mechanism such that when a voice input is received, the voice input is sent to a speech recognition engine based on said grammar to obtain an action-context pair from the plurality of framework action-context pairs and the action-context pair is used to select and trigger the handler in the VCA to execute the action intended by the voice input.

11. A voice controlled application (VCA) development system, comprising:
a processor;
a storage device accessible by the processor;
a voice controlled application development framework comprising:
  a plurality of framework action-context pairs that serve to direct execution of the VCA, wherein each framework action-context pair defines an action and a list of parameters related to the action and the respective value types of the parameters;
  at least one of a voice recognition engine (VRE) and a natural language library to match each framework action-context pair with semantically related vocabulary;
  a grammar automatically generated to capture knowledge about natural language understanding in the context of said VCA;
  a registration mechanism that permits an association to be formed between an action-context pair and a handler in the voice controlled application;
  wherein the processor:
    receives a voice input,
    applies the voice input to the VRE to transform the voice input into natural language text,
    applies the natural language text to the automatically generated grammar to identify at least one framework action-context pair, and
    uses the action-context pair to select and trigger the handler in the VCA to execute the action intended by the voice input.

12. The development system of claim 11, wherein the framework further comprises:
a handler definition mechanism comprising types, classes, and interfaces or utilities that are usable to define actions, contexts, and handlers; and
a dispatching mechanism comprising interfaces or utilities that are usable to look up a registration at runtime;
wherein the registration mechanism comprises interfaces or utilities that are usable to define a registration element to hold registrations at runtime.

13. The development system of claim 12, wherein the registration element comprises a table, a hash, or registration mapping.

14. The development system of claim 12, wherein the framework is additionally provided with further utility mechanisms selected from the group consisting of:

setup and configuration mechanisms;
start and stop listening to voice command mechanisms used to customize a triggering of voice control;
custom semantic mappings;
special handlers, in the action handler registration, for error and exception handling;
lightweight voice control;
stage setup and transitioning;
a text-to-speech API for voice interaction; and
a mechanism for interrupting a current task with specific voice commands.

15. The development system of claim 11, further comprising a data store comprising:
an application action-context pair that holds a plurality of application action-context pairs selected by an application developer for a VCA from the framework action-context pairs, that define voice control of the VCA, wherein each application action-context pair defines an action and a list of parameters related to the action and respective value types of the parameters;
an application handler of the VCA associated with each of the application action-context pairs; and
a VCA executable file that uses the action-context pairs and associated application handler.

16. The development system of claim 15, wherein the data store further comprises:
a new application action-context pair defined by an application developer that is not present in the framework action-context pairs;
an application grammar for the new application action-context pair that uses the natural language library to match the new application action-context pair with new semantically related vocabulary;
a registration mechanism that registers the new application action-context pair and associated grammar with the application action-context pairs; and
a new application handler association link that links the new application action-context pair.

17. The development system of claim 15, wherein the data store further comprises:
a new application grammar defined for a specific application action-context pair using the natural language library to match the specific application action-context pair with new semantically related vocabulary, wherein the new application grammar is registered with the specific application action-context pair.

18. User equipment (UE), comprising:
a microphone;
a storage area;
a VCA executable file that uses action-context pairs and associated VCA application handlers associated with each action-context pair;
an assignment element that assigns VCA handler execution addresses to each of the action-context pairs at run-time;
an access element for accessing at least one of a voice recognition engine (VRE) and a natural language library on the UE or on a networked cloud and translating voice input into a run-time action-context pair, wherein the run-time context contains a list of parameter values related to the action;
a speech recognition engine for obtaining a run-time action-context pair from a voice input, said speech recognition engine being based on a grammar automatically generated to capture knowledge about natural language understanding in the context of said VCA;

an execution element that executes a specific VCA handler at the VCA handler execution address associated with the run-time action-context pair.

19. The UE of claim 18, further comprising:
a utility that dynamically assigns a new VCA handler execution address with a previously assigned application action-context pair.

* * * * *